Figure 1:
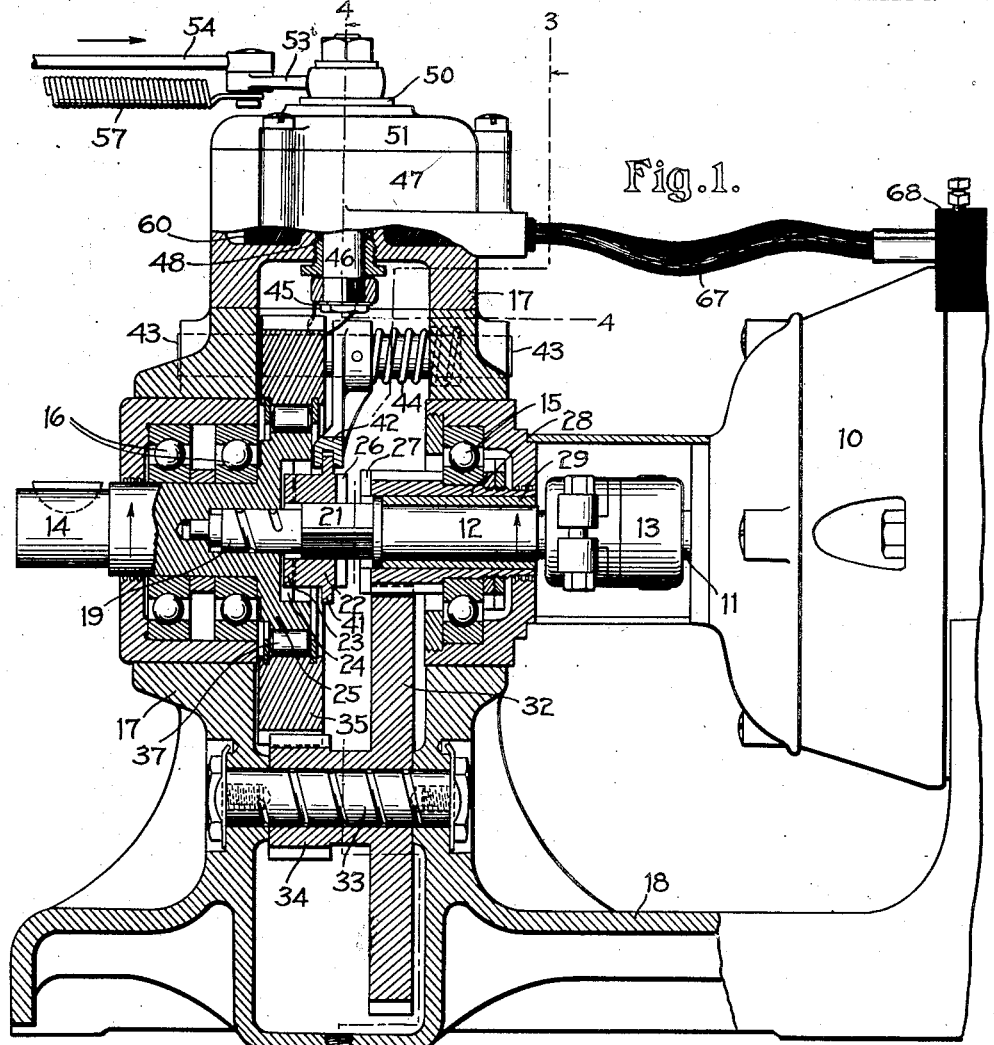

E. A. HALBLEIB.
POWER TRANSMISSION MECHANISM.
APPLICATION FILED FEB. 8, 1913.

1,101,539.

Patented June 30, 1914.
2 SHEETS—SHEET 1.

Witnesses:
Clarence W. Carroll
L. Thon

Inventor:
Edward A. Halbleib
by his attorneys
Osgood, Davis & Dorsey

E. A. HALBLEIB.
POWER TRANSMISSION MECHANISM.
APPLICATION FILED FEB. 8, 1913.
Patented June 30, 1914.
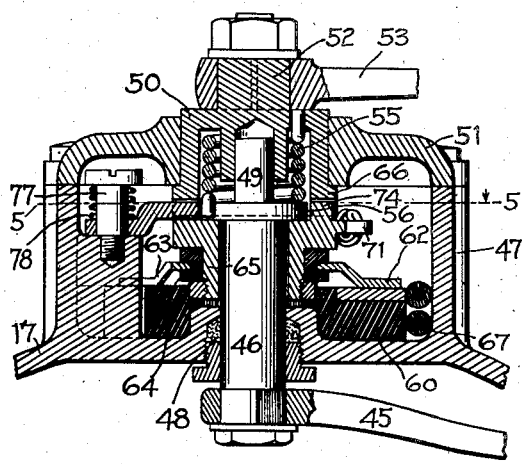
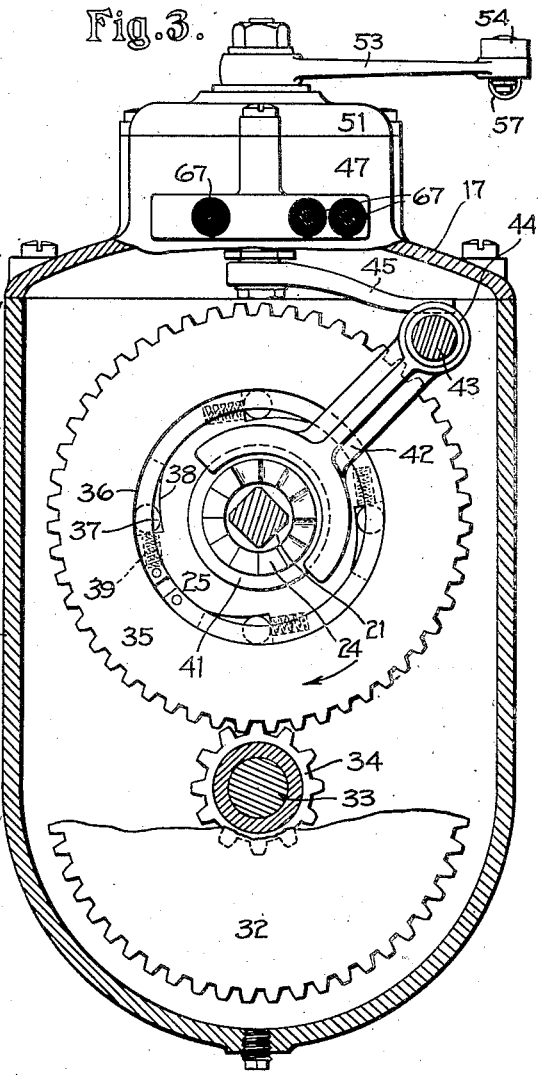
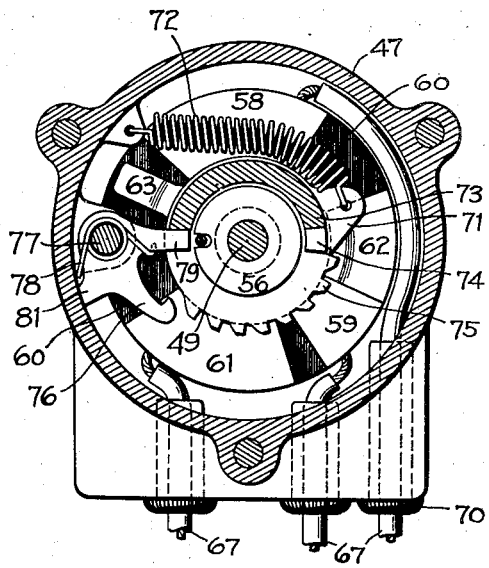

UNITED STATES PATENT OFFICE.

EDWARD A. HALBLEIB, OF ROCHESTER, NEW YORK, ASSIGNOR TO NORTH EAST ELECTRIC COMPANY, OF ROCHESTER, NEW YORK, A CORPORATION OF NEW YORK.

POWER-TRANSMISSION MECHANISM.

1,101,539.     Specification of Letters Patent.     Patented June 30, 1914.

Application filed February 8, 1913. Serial No. 747,185.

*To all whom it may concern:*

Be it known that I, EDWARD A. HALBLEIB, a citizen of the United States, and resident of Rochester, in the county of Monroe and State of New York, have invented certain new and useful Improvements in Power-Transmission Mechanism, of which the following is a specification.

This invention relates to mechanism for connecting two prime-movers, and for controlling the production of power by one, at least, of said prime-movers, whereby either of them may be caused to furnish power to actuate the other as circumstances may require.

The invention is particularly designed for use in connection with apparatus associated with an internal-combustion engine, such apparatus including a prime-mover, such as an electric generator, which may operate either as a dynamo, when actuated by the engine, or as a motor to provide power for starting the engine from a condition of rest. Such an apparatus is disclosed, for example, in my pending application, filed November 6, 1911, Serial No. 658,902, and the present invention comprises various improvements in the power-transmission mechanism disclosed in said application. Power-transmission mechanism of the type in question usually comprises two rotary elements or shafts which may be connected, respectively, with the prime-movers, together with clutches for controlling the coöperative relation of these elements; and in the case of mechanism adapted for use in connection with an electric motor-generator it also usually comprises speed-changing gearing, controlled by the clutches, whereby the speed-ratio of the rotary elements may be changed according as the one or the other constitutes the driving-element.

One object of the present invention is to produce a mechanism, including clutches and gearing for the purposes referred to, of simple, compact and efficient form, and to this end I employ, among other features of construction and arrangement, a gearing in which an axially-movable clutch-member is employed, in the manner hereinafter set forth, in place of one or more of the automatic one-direction clutches employed in the mechanism of said application.

Another object of the invention is to produce a mechanism in which one of the rotary elements, which may be designated, for convenience, as the "secondary" element, cannot, under any circumstances, act as a source of power for actuating the other or "primary" rotary element when the mechanism is set or adjusted for operation in the opposite direction—that is, to permit power to be transmitted from the primary element to the secondary element. This arrangement is particularly useful when the secondary element is connected with an electric generator as in said application, since it provides that if, owing to the low speed of the engine, the generator tends to overrun the engine as a result of return-flow of current from a storage-battery normally charged by the generator such overrunning of the generator is entirely free so that an effective counter-electromotive force may be produced in the generator whereby such return-flow of current is resisted and limited. To this end the invention comprises mechanism in which a novel arrangement of clutches is employed in the manner hereinafter set forth.

A further object of the invention is to provide, in connection with a transmission-mechanism including a movable clutch-member, and with a controlling-device for controlling the generation of power by one of the prime-movers connected by the transmission-mechanism, mechanism for operatively connecting the transmission-mechanism and the controlling-device in such a manner that the latter acts to throw said prime-mover into or out of operation, as a source of power, only when the clutch-elements are effectively engaged in one of their operative positions, and not in the intermediate disengaged positions of the clutch-elements. To this end the invention comprises mechanism which is hereinafter particularly described as employed to actuate the contact-devices of an electric circuit-controller connected with a motor-generator, but which may obviously be employed as well to actuate controlling-devices of other kinds according to the nature of the prime-mover to be controlled.

Other objects and features of the invention will be set forth hereinafter, in connection with the description of the preferred embodiment of the invention.

Figure 2:
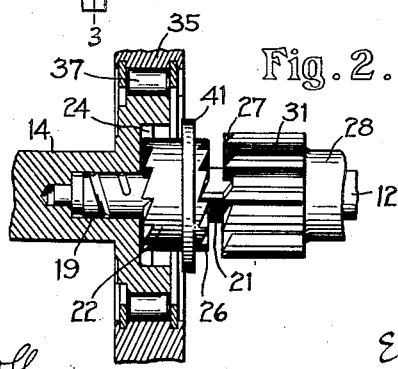

In the accompanying drawings:—Figure 1 is a side-elevation, partly in vertical, median section, of power-transmission mechanism embodying the present invention; Fig. 2 is a detail-view, partly in vertical section, showing particularly the form and arrangement of the clutches of said mechanism; Fig. 3 is a vertical section on the line 3—3 in Fig. 1; Fig. 4 is a vertical section, on a larger scale, on the line 4—4 in Fig. 1; and Fig. 5 is a horizontal section on the line 5—5 in Fig. 4.

The invention is illustrated as employed in connection with engine-starting apparatus of the type disclosed in my said application, this apparatus including an electric generator 10, of which the construction is not particularly illustrated as it may be any ordinary or suitable form of direct-current generator, provided it is adapted to operate also as a motor when energized by current from a suitable source. Although the generator, in the operation of the apparatus, acts also as a motor, it will hereinafter, for convenience, be referred to simply as a generator. The armature-shaft 11 of the generator is arranged in alinement with a shaft 12 which constitutes, in effect, a continuation of the armature-shaft, but which is connected, for convenience, with the latter by means of a yielding coupling 13 of the well-known Oldham form. A third shaft 14, which is arranged in axial alinement with the shaft 12, is adapted to be connected rotatably, in any convenient manner, with the crank-shaft of the engine in connection with which the apparatus may be employed. For convenience the two shafts 12 and 14 are hereinafter designated, respectively, as the secondary rotary element and the primary rotary element, although, under the various conditions of operation, either one or the other may act as the driving element and the other as the driven element.

The shaft 12 is supported indirectly by a ball-bearing 15, and the shaft 14 is supported by a pair of ball-bearings 16, these bearings all being mounted in a gear-casing 17 which is connected rigidly, by means of a frame-member 18, with the casing of the generator. The left-hand end of the shaft 12 is further supported by means of an integral extension 19 journaled in a recess in the shaft 14. This extension also provides a thrust-bearing to prevent longitudinal movement of the shaft 12 toward the left. The shaft 12 is provided with an intermediate squared portion 21 which engages a central opening of similar form through a clutch-member 22, this member being thereby mounted upon the shaft so as to rotate in unison therewith, while free for longitudinal movement upon the portion 21. The clutch-member 22 is provided, at its left-hand face, with a series of beveled clutch-teeth 23 which are adapted to coöperate with similar teeth 24 formed in a shell or enlargement 25 at the right-hand end of the shaft 14. Accordingly, in the position of the parts illustrated in Figs. 1 and 2, the shaft 14, rotating in the direction indicated by the arrow in Fig. 1, may actuate the shaft 12 in the same direction and at the same speed, thus driving the generator and causing it to generate electricity. This is the normal position of the apparatus when employed in connection with a hydrocarbon engine in an engine-starting system, the generator being actuated, provided the engine is in operation, both to recharge the storage-battery and to supply current for any translating-devices, such as electric lights, which may be connected with the system.

In order that the generator may effectively actuate and start the engine when necessary, speed-reducing gearing is provided through which the secondary rotary element or shaft 12 may drive the primary rotary element or shaft 14. To throw this gearing into or out of operation, as required, the sliding clutch-member 22 is provided, at its right-hand face, with a second series of beveled clutch-teeth 26 which are adapted to coöperate with similar teeth 27 formed at the end of a sleeve 28. The member 22 thus constitutes, integrally, elements of two distinct clutches. The sleeve 28 rotates loosely upon the shaft 12 and is supported directly by the ball-bearing 15; while it has a bearing-bushing 29 to engage the shaft 12. The shaft and the sleeve are thus free to rotate independently of each other, while supported in common by the ball-bearing 15 which also serves to prevent endwise motion of the sleeve. In addition to the clutch-teeth 27 the sleeve 28 is provided with peripheral gear-teeth 31, so that it constitutes a pinion, and these teeth are constantly in mesh with the teeth of a large gear 32 which is journaled upon a shaft 33 fixed in the gear-casing parallel with the shafts 12 and 14. Integral with the gear 32 is a pinion 34 which meshes, in turn, with a gear 35 co-axial with the shafts 12 and 14. The gear 35 is annular in form, and it is mounted upon the shell 25 through the intermediation of rolling clutch-members. As shown in Fig. 3 the gear 35 is provided with a smooth inner clutch-surface 36 whereby it constitutes an element of a one-direction clutch. The other element of this clutch is the shell 25, which is provided with a series of inclined pockets 38. In these pockets are hardened rollers 37 which are pressed toward the shallow ends of the pockets by springs 39, and which act, in a well-known manner, to grip against the surface 36 so as automatically to prevent relative rotation of the gear 35 in a left-hand direction upon the shell 25. The arrangement just described constitutes, therefore, an automatic one-direction clutch through which the gear 35, rotating in the direction of the arrow in Fig. 3, may drive the shell 25 and the shaft 14 in the same direction and at the same speed, while, on the other hand, this arrangement permits the shaft 14 at any time to overrun the gear 35.

When the sliding clutch-member 22 is moved to disengage the gear-teeth 24 and engage the teeth on the sleeve 28, rotation of the shaft 12 is the direction of the arrow applied to it in Fig. 1 causes rotation of the sleeve 28, which, through the speed-reducing gearing and the one-direction clutch above described, causes rotation of the shaft 14 in the same direction but at a lower speed, and this operation of the mechanism is employed to start the engine, connected with the shaft 14, from a position of rest. As soon as the engine begins to operate under its own power, however, and at a sufficient speed of rotation, it tends to overrun the gearing, as is permitted by the one-direction clutch as above described, and the sliding clutch-member 22 may then be returned to normal position to disconnect the gearing and couple the shaft 14 directly with the shaft 12. To operate the sliding clutch-member 22 as above described, I illustrate means which act under manual control. The clutch-member 22 is provided with a peripheral flange 41 which is embraced by the segmental slotted end of an arm 42. This arm is fixed upon a slide-rod 43 which is arranged to slide in the gear-casing parallel with the shafts 12 and 14. A compression-spring 44, coiled about the rod 43, acts normally to hold the parts in the position of Fig. 1, but by sliding the rod to the right, against the opposition of the spring, the arm 42 may be caused to move the clutch-member 22 to the right as above described. To actuate the arm and the slide-rod a second arm 45 is fixed to the lower end of a shaft 46, which is journaled in vertical position at the upper part of the casing. This part of the casing, indicated by the reference-number 47, may be designated as the switch-casing, since it incloses the elements of an electric switch. The shaft 46 passes, near its lower end, through a stuffing-box 48 which prevents the escape of oil from the gear-casing to the switch-casing. The upper end 49 of the shaft 46 is reduced in diameter and journaled in a sleeve 50 which, in turn, is journaled in the cover 51 of the switch-casing. The sleeve 50 has a squared upward projection 52 upon which is fixed an arm 53. This arm may be connected with any suitable means, such as a push-rod 54, through which the arm and the parts connected therewith may be operated manually. The partial rotation imparted to the sleeve 50 by the arm 53 is communicated to the shaft 46 by means of a spring 55, which is coiled within an annular recess in the sleeve 50. The upper end of this spring is seated in a socket in the sleeve, while the lower end engages a socket formed in a flange 56 which projects integrally from the shaft 46. Accordingly, when the arm is swung in the direction indicated by the arrow in Fig. 1, the spring 55 is subjected to a torsion which causes it to turn the shaft 46, whereupon the arm 45, through its engagement with the hub of the arm 42, forces the latter arm and the slide-rod 43 to the right, as shown in Fig. 1, in opposition to the pressure of the spring 44, thus shifting the sliding clutch-element 22 for the purpose above described. To return the parts to normal position a tension-spring 57 is attached, at one end, to the arm 53, as shown in Fig. 1, the other end of this spring (not shown) being attached to any convenient fixed point.

When shifting the clutch-mechanism, as above described, to cause the generator to act as a source of power for actuating the engine, it is necessary also to make certain changes in the electric circuits connected with the generator, whereby the generator is caused to act as a motor; and the switch-mechanism for this purpose is inclosed within the switch-casing 47 and is actuated by the sleeve 50. As shown particularly in Figs. 4 and 5, a base 60 of insulating material is fixed at the bottom of the switch-casing 47, and this base supports three fixed contact-members 58, 59 and 61. The movable contact-member comprises two contact-fingers 62 and 63 which are adapted to coöperate with the fixed contacts. These fingers are formed integral with a collar which surrounds the shaft 46 and which is fixed in an insulating-bushing 64. This bushing, in turn, is fixed on a sleeve 65 concentric with the shaft 46. The sleeve is free both to turn and to slide longitudinally upon the shaft, and the shaft, in turn, is free to slide longitudinally with respect to the stuffing box 48 and the sleeve 50. Accordingly, the spring 55, in addition to its operation as a torsion-spring as above described, may also be employed, through its tendency to longitudinal expansion, as a means for maintaining the contact-members of the switch in firm engagement, since the thrust of the spring is transmitted, through the flange 56, to the sleeve 65, and thence to the contact-fingers, thus causing the fingers to be pressed firmly against the fixed contacts and the base 60 in all positions of the switch. This thrust is resisted in the opposite direction by means of a shoulder 66 on the sleeve 50, which engages a thrust bearing on the cover 51 of the switch-casing.

The several fixed contacts of the switch are connected, through insulated wires 67, with the generator, these wires being shown as passing through insulating-bushings 70 in the side of the switch-casing, and thence to terminals 68 on the generator. It is not necessary to illustrate particularly the arrangement of the circuits by which the generator is controlled by the switch, as such arrangements are well known and are illustrated, for example, in my said application.

The nomal position of the switch is shown in Figs. 4 and 5, and the switch is maintained in this position by means of a tension-spring 72, of which one end is attached to an arm 71 projecting from the switch-sleeve 65, the other end of the spring being fixed to the switch-casing. In this normal position the contact-finger 62 engages one of the fixed contacts 59, while the finger 63 engages the insulating-base 60. The switch is thus normally in open-circuit position. The switch is moved to closed-circuit position by means of a segmental downward projection 73 on the sleeve 50. The right-hand end of this projection normally engages a lug 74 projecting upwardly from the switch-sleeve 65. Accordingly, when the sleeve 50 is rotated in a clockwise direction to operate the clutch-mechanism as above described, the projection 73 pushes the lug 74 so as to cause a similar and equal rotation of the movable switch-member. The proportions of the parts are such that during this movement the sliding clutch-member 22 is moved fully into engagement with the clutch-teeth 27 before any circuit is closed by the switch. After the completion of this movement of the clutch-element, however, which causes the further rotation of the shaft 46 to be arrested, the rotation of the sleeve 50 may be continued, owing to the yielding connection afforded between the sleeve and the shaft by the spring 55, and this continued movement results in bringing the contact-finger 63 into engagement with the fixed contact 58, thus closing the circuit between the fixed contacts 58 and 59, and the further continued movement of the sleeve 50 causes the contact-finger 62 finally to engage the fixed contact 61 as well, while the contact-finger 63 continues in engagement with the fixed contact 58, thus closing a further circuit. As above stated, the circuit-closing action of the switch, by which the generator is caused to act as a motor, does not occur until the clutch-member 22 has been shifted from one operative position to the other for the same purpose. It is equally important that the switch shall not be returned to its normal position, so as to deënergize the generator as a motor, until the sliding clutch-member has been brought fully back to normal position. Accordingly, means are provided for retaining the switch against such return-movement until the proper moment. To this end the sleeve 65 is provided with a toothed flange 75 which coöperates with a hooked detent 76 pivoted upon a stud 77 in the switch-casing. A spring 78, coiled about the stud and engaging the detent, tends to throw the detent into engagement with the toothed flange. Accordingly, after the switch-sleeve has been turned in a clockwise direction, it is retained in the position to which it has been turned until released from the action of the detent.

In order that the switch may be so released at the proper moment, the detent is provided with a release-arm 79 which is adapted to engage the left-hand extremity of the projection 73 on the sleeve 50. This engagement cannot occur until the sleeve 50 has returned nearly to its normal position. When it does occur, however, the detent is thrown into the inoperative position of Fig. 5, against the opposition of its spring 78, thus disengaging it from the switch-sleeve and permitting the spring 72 to return the switch to normal position. The detent is provided with a stop-lug 81 which engages the inner surface of the switch-casing, so that it is adapted to operate, through engagement with the projection 73, as a stop to determine the normal position of the switch, as shown in Fig. 5. Another advantage of the arrangement just described resides in the fact that it provides for a rapid return-movement or snap-action of the switch when moving in the direction to break the circuits which have been closed by it, this arrangement having the advantages well understood by those skilled in the art.

Owing to the provision of a series of closely-spaced teeth on the switch-sleeve, to coöperate with the detent 76, the detent may act to arrest the switch not only in its ultimate circuit-closing position, but in any intermediate position to which it may be moved. This arrangement is of value as it guards against danger to the mechanism which might arise from careless and incorrect operation on the part of the operator. In the absence of this arrangement it would be possible to move the mechanism sufficiently to engage the sliding clutch-member 22 with the sleeve 28, and at the same time to move the switch to an intermediate circuit-closing position, and the operator might then carelessly permit the parts to return partly to normal position, thus opening the circuits through the generator, and disengaging the clutch-element 22 from the sleeve 28 without permitting it to reëngage the clutch-teeth 24. In such a case the generator would be both deënergized and disconnected from the shaft 14, so that it would come to rest. If the engine should be in operation at such time it might then be possible to throw a severe strain upon the mechanism by permitting the clutch-member 22 to return into engagement with the clutch-teeth 24, thus imposing upon the mechanism the duty of starting the generator suddenly into rapid rotation. The arrangement above described prevents this action, however, since the switch, when once moved to circuit-closing position, cannot return from that position until released automatically, as above described, after the clutch-member 22 has returned fully to operative connection with the shaft 14.

While I have described an electric switch as the device employed to control the production of power by the prime-mover embodied in the generator 10, it will be apparent that the arrangement by which the action of the switch and of the clutch-mechanism is properly coördinated is applicable to apparatus in which prime-movers of other types are employed, the electric switch constituting merely a prototype of a controlling-device which may be adapted, in its character and construction, to the particular form of prime-mover employed in any given case, and therefore in the succeeding claims I have referred generally to a controlling-device, this term signifying either an electric switch or any equivalent controlling-device, whether electrical or not.

In the use of an electric generator connected with a storage-battery, as disclosed in my said application, the direction in which current tends to flow between the generator and the battery depends upon the relative electromotive forces of these parts. When the engine is operating at such a speed that the electromotive force produced by the generator is greater than that produced by the storage-battery, current tends to flow from the generator through the battery, thus recharging the battery. In case the speed of the engine falls below a predetermined point, however, the electromotive force of the generator becomes less than that of the battery, and current tends to return from the battery through the generator, thus causing the generator to act as a motor. To prevent this return-flow of current under normal circumstances it has been common to employ, in storage-battery systems such as are employed upon automobiles or railway-vehicles subject to wide variations in the speed of their engines or other sources of motive power, a device in the nature of a relay which acts as an automatic cut-out to prevent, or substantially reduce, the return-flow of current. While such an arrangement may be employed in connection with the power-mechanism herein disclosed, this mechanism affords an arrangement which is well adapted to dispense with such a device where it is considered undesirable for any reason. It will be apparent that the slidable clutch-member 22, owing to the fact that its clutch-teeth are beveled in one direction and that it is held in engagement with the clutch-teeth 24 only by the resilient action of the spring 44, constitutes a yielding device or one-direction clutch, since it is substantially free at any time to overrun the shaft 14 by sliding to the right so as to disengage its teeth from the teeth 24. At the same time, since the speed-reducing gearing is entirely disconnected, operatively, from the generator-shaft while the generator is generating, it follows that whenever return-flow of current occurs from the battery the generator is free, in consequence of such current, to rotate as a motor and overrun the shaft 14 to an indefinite extent. Accordingly, the generator can run substantially without load at such a time, so as to attain a speed which will result in an effective counter-electromotive force whereby the return-flow of current will be reduced to a minimum. At the same time the mechanism automatically affords an audible warning to the operator that such return-flow of current is occurring, since the teeth of the clutch-element 22, in riding over the teeth 24, cause a buzzing noise, and in this manner the operator may be warned to operate any suitable manual device for opening the charging-circuit between the generator and the battery.

Another advantage of the present mechanism resides in the fact that the mechanism is not locked, in any position, against reverse rotation of the shaft 14. Where automatic one-direction clutches are employed as the sole means for controlling the power-mechanism this is not the case. By the use of the sliding clutch-member 22, however, which acts always to disengage one clutch when engaging the other, provision is made whereby a reverse rotation of the shaft 14, such as might be caused by a back-kick in the engine to which it is connected, cannot result in injury to the mechanism. If such reverse rotation occurs while the mechanism is in its normal position, as in Fig. 1, the reduced-speed gearing and the sleeve 28 are merely rotated idly in a reverse direction, through the action of the one-direction clutch by which the shaft 14 and the gear 35 are connected, while the beveled teeth 24 and 23 slip idly by each other. On the other hand, if such reverse rotation occurs when the mechanism is in position for starting the engine, the movement is merely transmitted through the gearing to the sleeve 28, the clutch-element 22 and the shaft 12; and a reverse rotation is imparted to the generator, which may easily occur owing to the comparatively slight inertia of the armature. In neither case can there be any interlocking action of the mechanism by which such reverse rotation can be positively arrested.

My invention is not limited to the embodiment thereof hereinbefore described and illustrated in the accompanying drawings, but it may be embodied in various other forms within the nature of the invention as it is defined in the following claims.

I claim:—

1. Power-transmission mechanism having, in combination with a primary rotary element and a secondary rotary element, one-direction clutch members through which the primary element may actuate the secondary element while the latter is free to overrun the former; means, including a second pair of clutch-members, through which the secondary rotary element may actuate the primary rotary element; and manually-operable means for throwing the second pair of clutch-members into and out of engagement.

2. In power-transmission mechanism comprising a primary rotary element and a secondary rotary element; clutch-mechanism for operatively connecting said elements, including a one-direction clutch whereby the primary element may drive the secondary element; said mechanism being adapted, in different operative positions, to afford a driving connection whereby the secondary element may actuate the primary element, or whereby the primary element may actuate the secondary element, in the same direction of rotation, through said clutch while the secondary element is free to overrun the primary element, or to permit the primary element to rotate freely in a reverse direction.

3. Power-transmission mechanism having, in combination with a primary rotary element and a secondary rotary element; a clutch for connecting said elements to permit the primary element to actuate the secondary element; and means, for connecting said elements to permit the secondary element to actuate the primary element, in the same direction of rotation, said means including speed-reducing gearing, an automatic one-direction clutch connecting the gearing with the primary rotary element, and a clutch adapted to be thrown out of position for operation in either direction, whereby the primary element is left free to rotate in either direction.

4. Power-transmission mechanism having, in combination with a primary rotary element and a secondary rotary element; a one-direction clutch for connecting said elements to permit the primary element to actuate the secondary element while leaving the secondary element free to overrun; and means, including speed-reducing gearing, for connecting said elements to permit the secondary element to actuate the primary element, in the same direction of rotation, said means including also a clutch adapted to be thrown to a position in which it is inoperative in either direction, whereby the primary element is left free to rotate in either direction, and manually-controlled means for throwing the last-mentioned clutch out of operation.

5. Power-transmission mechanism having, in combination with a primary rotary element and a secondary rotary element; speed-reducing gearing and an automatic one-direction clutch adapted to rotate the primary element; and manually-controlled clutch-mechanism adapted, in alternative positions, to couple the secondary element with said gearing to actuate the primary element, or to couple the primary element with the secondary element to actuate the latter independently of the gearing.

6. Power-transmission mechanism having, in combination with a primary rotary element and a secondary rotary element; a one-direction clutch for connecting said elements, whereby the primary element may actuate the secondary element; gearing connected with the primary element; a clutch for connecting said gearing with the secondary element, whereby the latter element may actuate the primary element; and means for holding the last-mentioned clutch out of operative position, whereby the secondary element may be left free to overrun the primary element.

7. Power-transmission mechanism having, in combination with two rotary elements; means, including clutch-mechanism for connecting said elements, whereby they may actuate each other alternatively, according to the position of the clutch-mechanism; manually-controlled means for moving the clutch-mechanism for such alternative operation; and a power-controller having a lost-motion connection with said manually-controlled means whereby the controller is moved to operate after the manually-controlled means have moved the clutch-mechanism from one alternative position to the other.

8. Power-transmission mechanism having, in combination, a primary rotary element and a secondary rotary element co-axially journaled; a pinion concentric with the secondary element and provided with clutch-teeth; a set of clutch-teeth on the primary element; a clutch-member mounted to slide, but not rotate, on the secondary element and having, on opposite faces, teeth adapted to coöperate with the before-mentioned sets of teeth alternatively; said rotary elements rotating normally in the same direction of rotation and the clutch-teeth on the primary element being inclined in a direction to permit the secondary element to overrun in the normal direction of rotation; a gear coaxial with the primary rotary element and connected therewith by a one-direction clutch arranged to permit the primary element to overrun in the normal direction of rotation; and speed-reducing gearing connecting said pinion with said gear to permit the secondary element to drive the primary rotary element through said one-direction clutch.

9. Power-transmission mechanism having, in combination, a primary rotary element; a secondary rotary element adapted to be connected with a source of power; a controller for said source of power; gearing and clutch-mechanism for connecting the rotary elements to permit them to actuate each other, alternatively, in the same direction of rotation, according to the position of the clutch-mechanism; means for moving the clutch-mechanism for such alternative operation; and mechanism, actuated by said means, for moving the controller to throw said source of power into or out of operation according as the secondary rotary element constitutes the driving element or the driven element, said mechanism being adapted to delay the operation of the power controller, in each direction, until the clutch-mechanism has been moved from one operative position to the other.

10. Power-transmission mechanism having, in combination, a primary rotary element; a secondary rotary element adapted to be connected with a source of power; a controller for said source of power; gearing and clutch-mechanism for connecting the rotary elements to permit them to actuate each other, alternatively, in the same direction of rotation, according to the position of the clutch-mechanism; means for moving the clutch-mechanism for such alternative operation; and mechanism, actuated by said means, for moving the controller to throw said source of power into or out of operation according as the secondary rotary element constitutes the driving element or the driven element, said mechanism being adapted to delay the operation of the power controller, in each direction, until the clutch-mechanism has been moved from one operative position to the other, and to prevent a retrograde movement of the power-controller, in the direction to shut off the power, after it has been moved in the opposite direction, until the clutch-mechanism has been returned to a position in which the primary rotary element can actuate the secondary rotary element.

11. Power-transmission mechanism having, in combination with a primary rotary element and a secondary rotary element, means, including a one-direction clutch, through which the primary rotary element may actuate the secondary rotary element while the latter is free to overrun; means, including a one-direction clutch, through which the secondary rotary element may actuate the primary rotary element, while the latter is free to overrun; and manually-operable means for throwing one of said clutches into or out of operation according as one or the other of the rotary elements is to constitute the driver.

12. Power-transmission mechanism having, in combination with a primary rotary element and a secondary rotary element, means, including a one-direction clutch, through which the primary rotary element may actuate the secondary rotary element, while the latter is free to overrun; driving-means through which the secondary rotary element may actuate the primary rotary element; and manually-operable means for throwing said driving-means into or out of operation as one or the other of the rotary elements is to constitute the driver.

EDWARD A. HALBLEIB.

Witnesses:
FARNUM F. DORSEY,
D. GURNEE.